(12) United States Patent
Zhao

(10) Patent No.: US 11,828,649 B2
(45) Date of Patent: Nov. 28, 2023

(54) APPARATUS AND METHOD FOR CALIBRATING RAMAN SHIFT

(71) Applicant: METROHM SPECTRO, INC., Plainsboro, NJ (US)

(72) Inventor: Jun Zhao, Plainsboro, NJ (US)

(73) Assignee: METROHM SPECTRO, INC., Plainsboro, NJ (US)

( * ) Notice: Subject to any disclaimer, the term of this patent is extended or adjusted under 35 U.S.C. 154(b) by 0 days.

(21) Appl. No.: 17/683,965

(22) Filed: Mar. 1, 2022

(65) Prior Publication Data

US 2022/0276092 A1 Sep. 1, 2022

Related U.S. Application Data

(60) Provisional application No. 63/154,887, filed on Mar. 1, 2021.

(51) Int. Cl.
*G01J 3/02* (2006.01)
*G01J 3/44* (2006.01)
*G01N 21/65* (2006.01)
*G01N 21/27* (2006.01)
*G01J 3/28* (2006.01)
*G01N 21/47* (2006.01)

(52) U.S. Cl.
CPC ........... *G01J 3/0297* (2013.01); *G01J 3/0286* (2013.01); *G01J 3/28* (2013.01); *G01J 3/44* (2013.01); *G01J 3/4412* (2013.01); *G01N 21/274* (2013.01); *G01N 21/65* (2013.01); *G01N 21/4785* (2013.01)

(58) Field of Classification Search
CPC ...... G01J 3/0297; G01J 3/0286; G01J 3/4412; G01J 3/28; G01J 3/44; G01N 21/65; G01N 21/274; G01N 21/4785; G01N 21/63
USPC ......................................................... 356/301
See application file for complete search history.

(56) References Cited

U.S. PATENT DOCUMENTS

| | | | | |
|---|---|---|---|---|
| 5,455,673 A * | 10/1995 | Alsmeyer | ................. | G01J 3/44 356/301 |
| 5,638,172 A * | 6/1997 | Alsmeyer | ............... | G01N 21/65 356/301 |
| 6,002,990 A * | 12/1999 | Hanna | ....................... | G01J 3/28 702/22 |
| 9,177,877 B2 * | 11/2015 | Beck | ..................... | G01J 3/0232 |
| 9,435,741 B2 * | 9/2016 | Kobayashi | .............. | G01J 3/021 |
| 9,941,660 B2 * | 4/2018 | Lin | ........................ | H01S 5/0604 |

(Continued)

FOREIGN PATENT DOCUMENTS

CN 105358946 B * 7/2017 ........... G01N 21/278

*Primary Examiner* — Michelle M Iacoletti
*Assistant Examiner* — Noah J. Haney

(57) ABSTRACT

A device for performing Raman spectroscopy measurements that incorporate Raman Shift calibration and related method for carrying out the Raman Shift calibration are disclosed. The device comprises of one or more Raman shift reference materials with one or more Raman bands, the positions of which are pre-determined to a high degree of accuracy within a useful temperature range. The device further comprises a sensor to measure the temperature of the one or more reference materials to provide accurate reference values for the Raman shift calibration. When used with the measured spectrum of the reference materials, an accurate Raman Shift calibration function of the device can be generated.

13 Claims, 10 Drawing Sheets

(56) References Cited

U.S. PATENT DOCUMENTS

| | | | |
|---|---|---|---|
| 11,287,384 B2* | 3/2022 | Norwood | G01J 3/44 |
| 2009/0015829 A1* | 1/2009 | Rezac | G01N 21/65 |
| | | | 356/301 |
| 2016/0223463 A1* | 8/2016 | Schmidt | G01J 3/0286 |

* cited by examiner

APPARATUS AND METHOD FOR CALIBRATING RAMAN SHIFT

RELATED APPLICATIONS

The present application claims priority to the U.S. provisional application No. 63/154,887, filed on Mar. 1, 2021, and titled Apparatus and Method for Calibrating Raman Shift, the content of which is incorporated by reference hereby in its entirety.

FIELD OF THE INVENTION

This invention generally relates to Raman spectroscopy, and more specifically to methods to calibrate the Raman shift axis of a Raman spectrometer.

BACKGROUND

Raman spectroscopy is a useful analytical technique based on the analysis of the Raman spectra of samples. A Raman spectrum is a two-dimensional diagram, with light intensity as the Y axis, and Raman shift as the X-axis. A Raman shift is measured in unit of wavenumbers ($cm^{-1}$). The Raman shift values of Raman peaks in a Raman spectrum correspond to the frequencies of vibrational or rotational modes of the molecules in the sample, and are fundamental properties of the sample molecules. However, in practice, Raman shifts are not measured directly, because it is a derived quantity, equal to the wavenumber of the excitation source minus the absolute wavenumber of the measured spectrum. To obtain an accurate Raman spectrum, the measurement device, a Raman spectrometer, must have its X-axis calibrated. High accuracy and stability of the Raman Shift axis is of great importance as many quantitative analysis methods are sensitive to abscissa errors. A calibration method that can accomplish this is of great value to the field of Raman spectroscopy.

Raman Shift calibration typically involves the use of a standard reference material that has one or more reference Raman peaks with accurately determined positions. The American Society for Testing and Materials (ASTM) E1840-96 (2014) provides several standard reference materials, for example, cyclohexane, polystyrene, and acetaminophen. However, the positions of most peaks in the ASTM standard are only determined to a precision of approximately 0.5 $cm^{-1}$, while for better performance, an accuracy or precision on the level of 0.1 $cm^{-1}$ is desirable. To achieve such high level of performance, the true peak positions of the standard reference material used for calibration must be known to a similar degree of accuracy at the time when the calibration is carried out and in the environment where the calibration is carried out.

Environmental factors greatly affect Raman Shift axis stability, and a Raman spectrometer needs to be calibrated frequently to maintain the required stability. Also, instrument calibration should not negatively affect its primary function, which is to measure samples. On some instruments, the operator may perform calibration manually, while on others, the instrument may be required to do it automatically without user intervention. Whether instrument calibration is performed manually or automatically, there is a need for improved Raman shift calibrations that can achieve a high degree of accuracy.

SUMMARY OF THE INVENTION

The present application discloses a method of calibrating the Raman Shift axis of a Raman spectrometer to a high degree of accuracy using a standard reference material. As will be demonstrated, the high accuracy is achieved by using a reference material whose Raman band positions are determined to a high degree of accuracy within a useful temperature range and by taking into consideration of the temperature of the reference material at the time of calibration. Through accurate reference values, the apparatus and methods disclosed herein can produce accurate Raman Shift calibration.

It is the goal of the present invention to provide a method of calibrating the Raman Shift axis of a Raman spectrometer to a high degree of accuracy, and a Raman measurement device that incorporate components to enable such calibration. The method uses one or more reference materials with one or more Raman bands, the positions of which are pre-determined to a high degree of accuracy within a useful temperature range, and a sensor to measure the temperature of the one or more reference materials in order to provide accurate reference values for the calibration.

In some embodiments, a method for calibrating a Raman shift axis of a Raman spectrometer using one or more Raman shift reference materials is provided. The method uses a Raman spectrometer which comprises an excitation source, a spectral analyzer, a sample interface, and a temperature sensor. The one or more Raman shift reference materials have one or more Raman peaks, and the relationships between the Raman shift values of the one or more Raman peaks and temperature are pre-established over a temperature range. The method comprises the following steps: measuring one or more calibration Raman spectra and a temperature of the one or more Raman shift reference materials; determining the Raman shift values of the one or more Raman peaks in the one or more calibration Raman spectra based on the measured temperature and a pre-established relationship between the Raman shift values and the temperature; and using the determined Raman shift values of the one or more Raman peaks and the measured one or more calibration Raman spectra to generate a Raman shift calibration function for the Raman spectrometer.

In some embodiments, the method further comprises measuring one or more spectra of one or more wavelength calibration light sources and generating a wavelength calibration function. In some embodiments, the method further comprises determining a Raman shift reference value of reference peaks of the one or more reference materials using a previously generated Raman shift calibration function, and generating a new Raman shift calibration function using the calibration Raman spectrum of the one or more Raman shift reference materials by modifying the previously generated Raman shift calibration function.

In some embodiments, the method further comprises monitoring the temperature of the spectral analyzer and/or the excitation source, and automatically initiating a new calibration of the Raman shift axis when the measured temperature has deviated significantly from the last calibration. For example, a change of 0.5° C. in the spectral analyzer temperature or a change of 0.3° C. in the laser temperature can cause the X-axis to drift by a desired Raman shift accuracy of 0.1 $cm^{-1}$. Therefore, a new calibration can be initiated if the temperature of the spectral analyzer has deviated from the last calibration by more than 0.5° C., or if the temperature of the laser has deviated from the last calibration by more than 0.3° C. In some embodiments, the deviation between the measured temperature and the temperature from the last calibration is determined and compared to a threshold. If the deviation is larger than the threshold, a new calibration is initiated. The threshold may be pre-determined based on experiments or collected data. In some embodiments, the method further comprises maintaining a constant temperature for the one or more Raman shift reference materials while measuring the one or more calibration Raman spectra.

In some embodiments, the one or more Raman shift reference materials comprises one of the materials specified in ASTM E1840-96 (2014).

The present application also discloses an exemplary device for measuring Raman scattering of a sample. The device comprises an excitation source configured to generate an excitation light, a spectral analyzer, a sample interface. During sample measurement, the excitation light is delivered to the sample to generate Raman scattered light from the sample. The Raman scattered light from the sample is delivered to the spectral analyzer. The device also includes one or more Raman shift reference materials having one or more Raman peaks. The relationships between the Raman shift values of the one or more Raman peaks and temperature are pre-established over a range of temperatures. The device further includes a calibration interface and a sensor for measuring the temperature of the one or more Raman shift reference materials. During a Raman shift calibration, the excitation light is delivered to the one or more Raman shift materials to generate Raman scattered light for calibration and the Raman scattered light for calibration is delivered to the spectral analyzer through the calibration interface to measure one or more Raman shift calibration spectra. The Raman shift values of the one or more Raman peaks of the one or more Raman shift reference materials are determined using the measured temperature and pre-established relationships between the Raman shift values and the temperature. The Raman shift values of the one or more Raman peaks of the one or more Raman shift reference materials and the one or more Raman shift calibration spectra are then used to generate a Raman shift calibration function of the device.

In some embodiments, the device includes means for switching a light path. The excitation light from the excitation source and the Raman scattered light delivered to the spectral analyzer can be switched between the sample and the one or more Raman shift reference materials. In one embodiment, the means for switching the light path comprises one or more fiber optic switches.

In some embodiments, the device may include one or more wavelength calibration light sources. In some embodiments, the device may store a Raman shift calibration function established in a known condition. In some embodiments, the device may include one or more temperature sensors that monitor the temperatures of the spectral analyzer and the excitation source in order to automatically initiate a new calibration of the Raman shift axis when the measured temperatures have deviated significantly from the temperatures measured during the last Raman shift calibration. In some embodiment, the device may include a regulator to control the temperature of the one or more Raman shift reference material.

The present disclosure further includes a device for measuring Raman scattering of a sample that comprises a Raman spectrometer, one or more Raman shift reference materials, and a temperature sensor. The Raman spectrometer may comprise an excitation source, a spectral analyzer, where the excitation source is configured to generate an excitation light. The one or more Raman shift reference materials have one or more Raman peaks, and the relationships between the Raman shift values of the one or more Raman peaks and the temperature are pre-established over a range of temperatures. The temperature sensor is configured to measure the temperature of the one or more Raman shift reference materials. The Raman shift values of one or more Raman peaks of the one or more Raman Shift reference material are determined using the measured temperature and the pre-established relationships between the Raman shift values and the temperature, and are used to calibrate the Raman shift axis of the spectrometer.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1A:
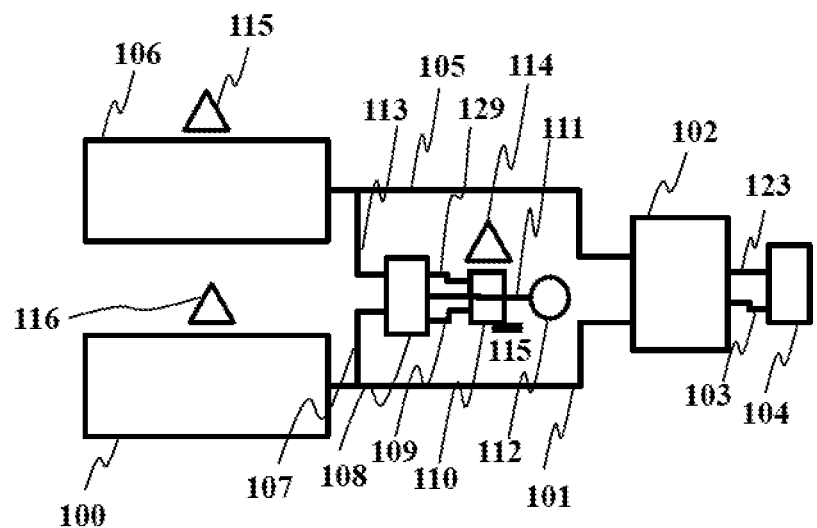
FIG. 1a, FIG. 1B, and FIG. 1c illustrate three exemplary embodiments of calibrating the Raman shift axis of a Raman spectrometer, using a reference material with Raman band positions whose dependence on temperature are predetermined to a high degree of accuracy, and a sensor to measure the temperature of the reference material in order to provide accurate reference values for the calibration.

Before describing in detail embodiments that are in accordance with the present invention, it should be observed that the embodiments reside primarily in combinations of method steps and apparatus components related to device for calibrating the Raman shift axis of a Raman spectrometer. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Raman shift is a derived quantity, equal to the wavenumber of the excitation source minus the absolute wavenumber of a measured spectrum. Consequently, there are two basic approaches to calibrate the Raman shift axis of a Raman spectrometer.

One approach is to calibrate the excitation wavenumber and the absolute wavenumber of a measured spectrum separately. The absolute wavenumber can be calibrated with atomic emission lines from standard wavelength calibration sources such as argon, neon, and mercury discharge lamps. If the excitation source is a gas laser, for example an argon ion or helium-neon laser, its gain bandwidth is so narrow that the frequency is known to a high degree of accuracy, for example, better than $0.1$ $cm^{-1}$, and does not need calibration. Diode or solid state lasers, however, are the most popular excitation sources, and their gain bandwidths are sufficiently wide such that their lasing frequencies vary from unit to unit, and may change with time by much more than $0.1$ $cm^{-1}$, despite efforts to lock down and stabilize them. The wavenumber of such lasers can be measured with an accurate wavemeter or a special purpose spectrometer, which are cumbersome and costly. Alternatively, the laser wavenumber can be calibrated with one or more Raman bands of a standard material of which the positions of the Raman bands are known. The ASTM E1840-96 (2014) provides several such standard materials, for example, cyclohexane, polystyrene, acetaminophen. This Raman shift calibration method includes the following steps: measuring an atomic emission spectrum to calibrate the X-axis into absolute wavenumber, measuring a Raman spectrum of a reference material and determining the absolute wavenumber of a reference Raman peak, adding the known Raman shift value of the reference Raman peak to the absolute wavenumber to obtain the wavenumber of the laser, and subtracting the absolute wavenumber values of the X-axis from the laser wavenumber to obtain the Raman shift values of the X-axis.

A second approach to calibrate the Raman shift of a spectrometer is to directly using multiple Raman bands of one or more standard reference materials, such as those given in the ASTM E1840-96, thus avoiding the use of atomic emission sources and the need to calibrate the absolute wavenumber and the laser wavenumber separately. This can be achieved by fitting the measured abscissa positions of these bands against their reference values with a mathematical function such as a polynomial curve.

There are variants to these two basic approaches. For example, an accurate calibration function can be first obtained using either one of the two aforementioned approaches. For subsequent calibrations, instead of re-generating new calibration functions in the same way, the first obtained calibration function can be corrected, by comparing the peak positions of one or more reference peaks of one or more reference materials determined using the first obtained calibration function with their true values.

All these calibration methods are based on the measurement of a Raman reference material, such as those given in the ASTM E1840-96. However, the Raman shift reference values given in the ASTM E1840-96 are averages of different results obtained in several laboratories. The reported uncertainty of many such Raman bands is approximately $0.5$ $cm^{-1}$ or higher. Thus, the accuracy of any calibration is limited by the accuracy of the reference values provided in the standard. Furthermore, the Raman shifts of the reference materials may change with temperature. Using fixed values as calibration reference would therefore give varying results as the temperature of the reference material changes. The method disclosed in the current invention uses a reference material with its Raman band positions determined to a high degree of accuracy within a useful temperature range, and measures the temperature of the reference material at the time of calibration. This provides more accurate reference Raman shift values and yields a more accurate calibrated Raman shift axis. The methods disclosed in the present disclosure can be applied to calibration of any Raman spectrometer.

Most commercial Raman spectrometers use diode lasers and solid state lasers as excitation sources, the frequencies of which tend to depend on environmental factors such as temperature and can drift over time. The spectral analyzer, whether it uses an interferometer or a dispersive element such as a grating or prism, is also affected by temperature changes that lead to frequency drifts. Therefore, to maintain persistent Raman shift accuracy, the spectrometer's Raman shift must be frequently re-calibrated. Using the method disclosed here to re-calibrate the Raman shift of the instrument as the environment changes can significantly improve the long term accuracy.

FIG. 1a illustrates an exemplary embodiment of the method of calibrating the Raman shift axis of a Raman spectrometer. An ordinary Raman spectrometer comprises of an excitation source 100, a spectral analyzer 106 and a sample interface 102. The excitation source 100 may contain one or more lasers emitting monochromatic lights at one or more wavelengths. The monochromatic light from the excitation source 100 is delivered to the sample interface 102 via light path 101. The sample interface 102 may contain any number and form of optics that together performs the function of delivering the excitation light via light path 103 to a sample 104 and collecting the Raman scattered light from the sample via light path 123. A variety of forms and designs of sample interfaces are known to those skilled in the art of Raman spectroscopy. The Raman scattered light is then delivered to the spectral analyzer 106 via the light path 105. The spectral analyzer may contain any number and form of optical elements and detectors that together performs the function of transforming the light received via the light path 105 into a Raman spectrum. Some spectral analyzers use dispersive elements such as gratings or prism, while others employ interferometers. In order to achieve accurate calibration of the Raman shift axis for the spectrometer, a calibration module comprising a calibration interface 108, a reference material 110, and a temperature sensor 114 are provided. Optionally, a regulator 115 may be included to control the temperature of the reference material 110. To perform accurate calibration, the calibration interface 108 receives the excitation light from the source 100 via light path 107, and delivers it to the reference material 110 via the light path 109. The reference material can be any chemical compound or a mixture of compounds that have one or more Raman peaks, of which the peak position as a function of temperature have been previously determined to a high degree of accuracy, preferably to about $0.1$ $cm^{-1}$, within an operable temperature range. Preferably the reference material is stable and does not go through phase change within the operable temperature range. It may be contained in an optically transparent container. Examples of the reference material include polystyrene, 4-acetaminophen, naphthalene, cyclohexane, toluene, acetonitrile, etc.

The reference material 110 generates Raman scattered light, which is received by the calibration interface 108 via the light path 129 and passed to the spectral analyzer 106 via the light path 113. The calibration interface 108 performs a similar function as the sample interface 102, and can be made in a variety of forms and designs. The spectral analyzer 106 transforms the Raman scattered light received via the path 113 into a Raman calibration spectrum, which contains one or more Raman peaks, of which the Raman shifts have been accurately characterized/determined as a function of temperature of the reference material. The temperature sensor 114 measures the temperature of the reference material 110, which when plugged into the functions yields accurate Raman shift values for the one or more Raman peaks in the Raman calibration spectrum. As will be demonstrated in subsequent figures, using such temperature dependent Raman shift values to re-calibrate the Raman shift axis of the spectrometer as the environmental condition changes yields more accurate Raman shift values for the sample's Raman spectrum than what would be possible using fixed Raman shift values for the reference material or doing no re-calibration at all. Additionally, a wavelength calibration light source 112 may be used as an absolute wavelength reference to calibrate the x-axis into absolute wavelength or wavenumber. The spectrum of the light source 112 contains multiple narrow peaks with fixed and accurately determined wavelengths. The source 112 can be a gas-discharge lamp such as a neon, or argon lamp. The light emitted by the source 112 is received by the calibration interface 108 via the light path 111 and passed to the spectral analyzer 106 via the light path 105, and results in a wavelength calibration spectrum. To minimize calibration error, the reference material 110 may be positioned in the light path 111 to transmit, reflect, or elastically scatter the light emitted by the source 112 toward the calibration interface 108, so that the light received from the source 112 by the spectral analyzer 106 has substantially the same spatial distribution as the Raman scattered light received from reference material 110.

Additional temperature sensors 115 and 116 may be optionally positioned to monitor the temperature of the spectral analyzer 106 and the excitation source 100, respectively. They can be used to initiate a new calibration of the Raman shift axis when the measured temperatures have changed significantly from the last calibration.

The various light paths such as 101, 103, 123, 105, 107, 113, 109, 129 and 111 may contain any number and form of optical or mechanical elements to realize the functions of delivering the respective light beams. For example, the light paths 101 and 107 may be realized by a fiber optic switch, wherein the common part of the two paths, 101 and 107, is realized by a common input optic fiber that connects to and receives excitation light from the source 100, and wherein the split parts of the two paths, 101 and 107, are realized by two separate output optic fibers that selectively directs the excitation light to either the sample interface 102 or the calibration interface 108. Likewise, the light paths 105 and 113 may be realized by another fiber optic switch, wherein the split parts are realized by two separate input optic fibers, which selectively receives light from either the sample interface 102 or the calibration interface 108, and wherein the common part of the two paths, 105 and 113, is realized by a common output optic fiber, which connects and sends light signal to the spectral analyzer.

Figure 1B:
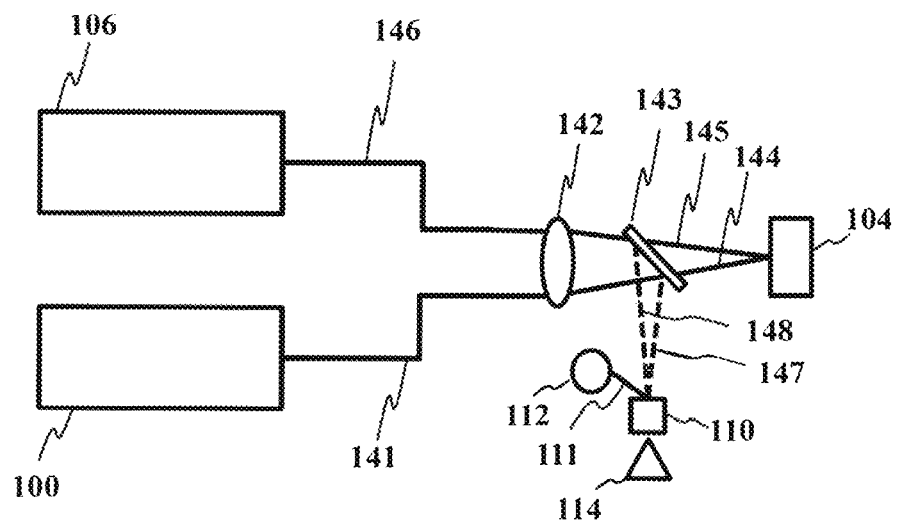

FIG. 1B illustrates an alternative optical arrangement embodying the present inventive principles. In FIG. 1B, the sample interface and calibration interface utilize the same components including a sampling optics 142 and a path switching optics 143. When acquiring the Raman spectrum of the sample 104, the path switching optics 143 is at a first position, the sampling optics 142 receives the excitation light via the light path 141 and delivers it to the sample 104 via the light path 144, and also collects the Raman scattered light from the sample 104 via the light path 145 and delivers it to the spectral analyzer 106 via the light path 146. When acquiring the Raman calibration spectrum of the reference material 110 and the wavelength calibration spectrum of the lamp 112, the path switching optics 143 is at a second position, directing the excitation light to the reference material 110 via the light path 147 and sending the Raman scattered light from the reference material 110 and the emission light from the lamp 112 to the sampling optics 142 via the light paths 148 and 111. The sampling optics 142 and the path switching optics 143 may incorporate one or more lenses, mirrors, fiber optics or other elements to perform the respective functions, and the switching optic 143 may be actuated manually or automatically through controlling software.

Figure 1C:
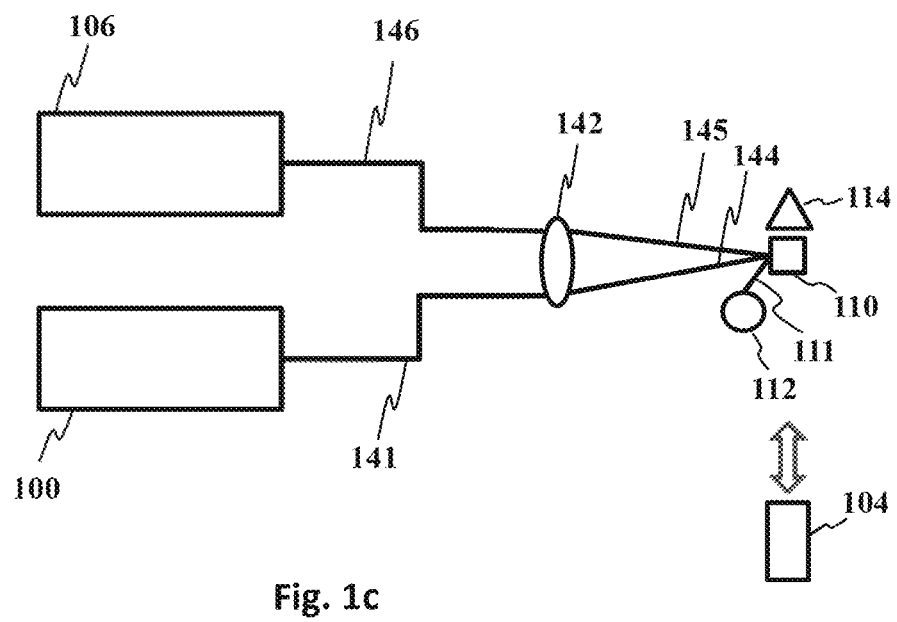

FIG. 1c illustrates another alternative optical arrangement embodying the present inventive principles, In FIG. 1c, the sample interface and calibration interface utilize the same component 142. When acquiring the Raman calibration spectrum of the reference material 110 and the wavelength calibration spectrum of the lamp 112, the reference material 110 is moved into the measurement position and is optically connected to the excitation path 144 and collection path 145, and the sample 104 is moved out of the measurement position. When acquiring the Raman spectrum of the sample 104, the sample 104 is moved into the measurement position and the reference material 110 is moved out. The movement of the sample and the reference material can be done manually or automatically through controlling software.

Figure 2A:
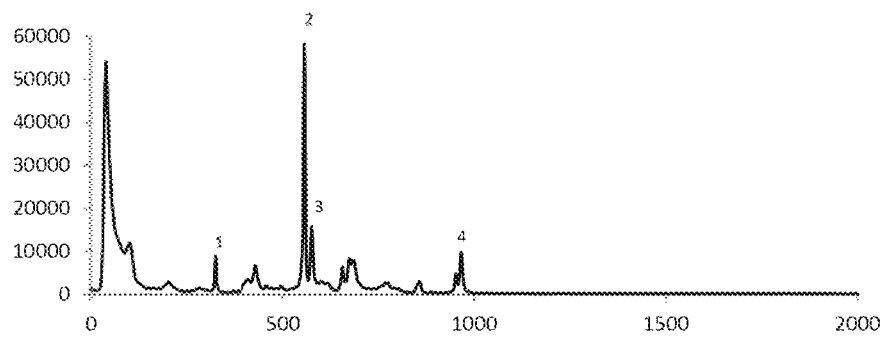
FIG. 2a illustrates a Raman spectrum of a reference material polystyrene.
Figure 4:
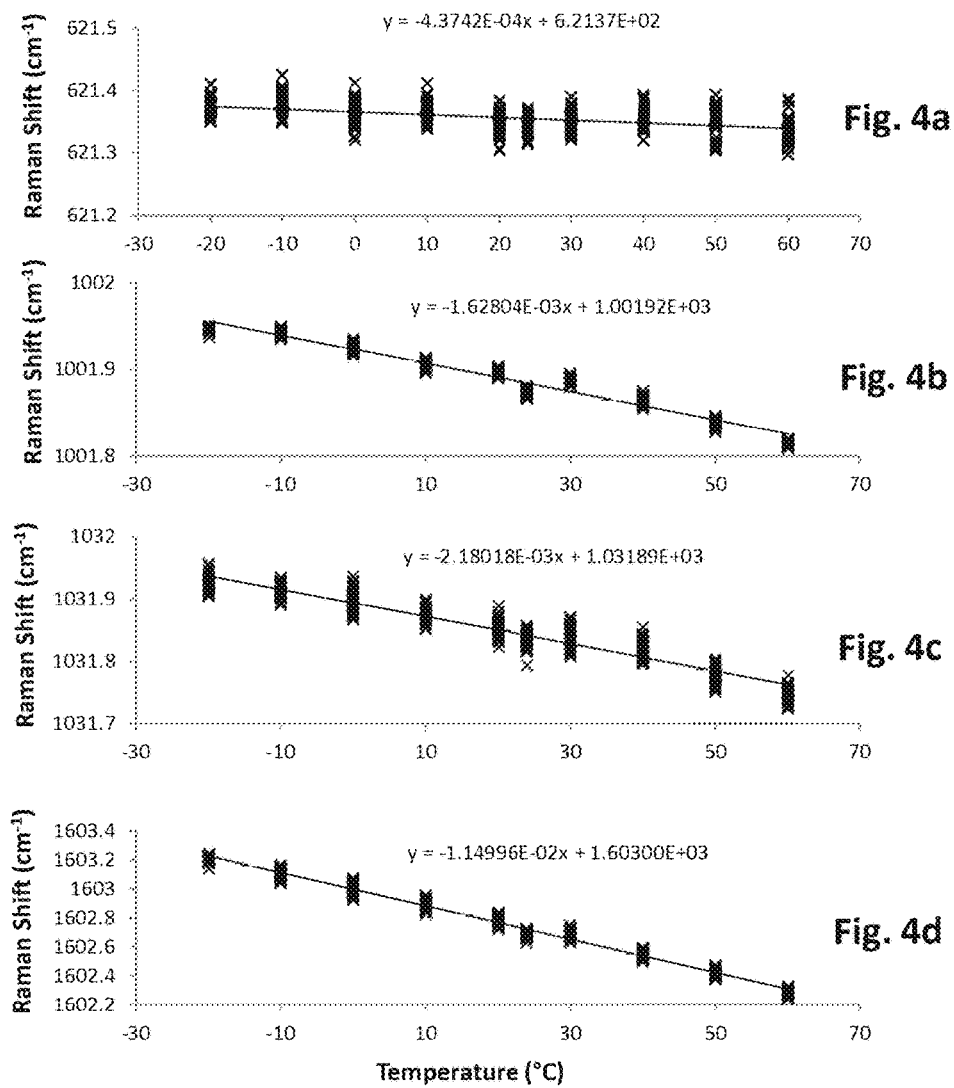
FIG. 4 illustrates the temperature dependence of the peak positions of four Raman peaks of the reference material polystyrene.

FIG. 2a shows a Raman calibration spectrum of a Raman shift reference material, polystyrene, measured with a dispersive spectral analyzer equipped with a charge-coupled device (CCD) detector at 20° C. The accurate Raman shift of the peaks labeled 1, 2, 3 and 4 are determined to be 621.35 $cm^{-1}$, 1001.89 $cm^{-1}$, 1031.85 $cm^{-1}$, and 1602.77 $cm^{-1}$, respectively, using pre-established Raman shift reference values along with the temperature relationships shown in FIG. 4.

Figure 2B:
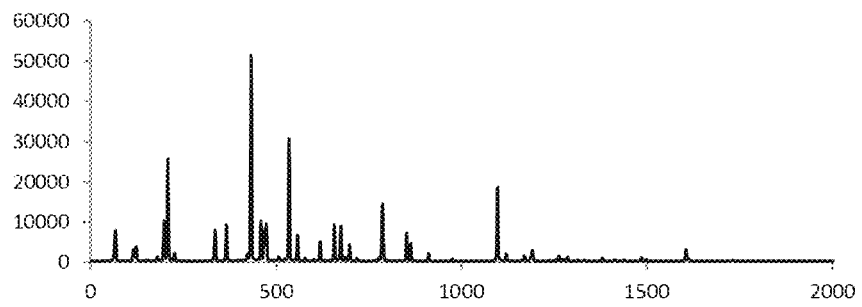
FIG. 2b illustrates a spectrum of a wavelength calibration source, an argon-neon lamp.

FIG. 2b shows a wavelength calibration spectrum obtained from an atomic emission light source 112, which is a discharge lamp containing both neon and argon gases. There are several well defined peaks in the spectrum shown in FIG. 2b that can be used for wavelength calibration.

Once the Raman calibration spectrum and the accurate Raman shift values of one or more Raman peaks are obtained, it is a matter of mathematical manipulation to utilize them to calibrate the Raman shift axis of the spectrometer. As stated previously, this can be performed in a number of different ways, all of which seek to derive a calibration function f(i) that relates the data point i to its Raman shift value R(i)=f(i), where i is the data index and can be any number from 1 to N, and N is the total number of data points in the spectrum. In spectroscopy the data index is often referred to as pixel value, which can be actual pixel value of a multichannel detector such as a CCD or InGaAs array used in a dispersive spectrometer, or data index of a Fourier transformed interferogram in the case of a Fourier transform spectrometer, or data index of mathematically generated data points by means of interpolation of actual data points. Thus, the center position of a peak can be expressed in pixel values, which may be fractional numbers. For example, the center of the peaks labeled 1 through 4 in FIG. 2a are at pixel 325.34, 556.92, 575.98, and 966.45, respectively.

Figure 3A:
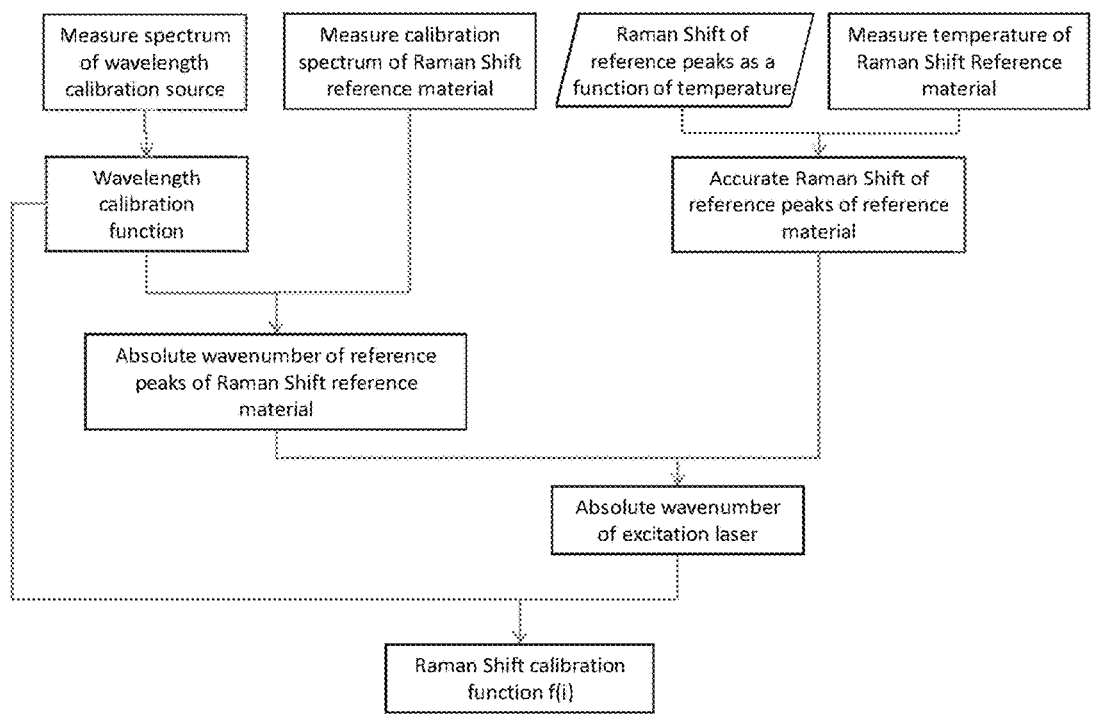
FIGS. 3a, 3b, and 3c are flowcharts illustrating three exemplary calibration methods.

As described previously, there are two basic approaches to derive the calibration function f(i). One approach utilizes the light source 112 as an absolute wavelength reference and one or more reference Raman peaks of one or more reference materials to determine the laser wavenumber. This includes measuring a spectrum of source 112, determining the accurate pixel positions of a number of peaks of the reference material 112, fitting their accurate wavelength values with a function such as a polynomial to calibrate the X-axis into wavelength, converting the wavelength values to absolute wavenumbers, measuring a Raman spectrum of a reference material 110, determining the absolute wavenumber of a reference Raman peak, adding the known Raman shift value of the reference Raman peak to the absolute wavenumber to obtain the wavenumber of the laser, and finally subtracting the absolute wavenumber values of the X-axis from the laser wavenumber to obtain the Raman shift values of the X-axis, i.e. the Raman shift calibration function f(i). FIG. 3a is a flowchart representing this approach.

Figure 3B:
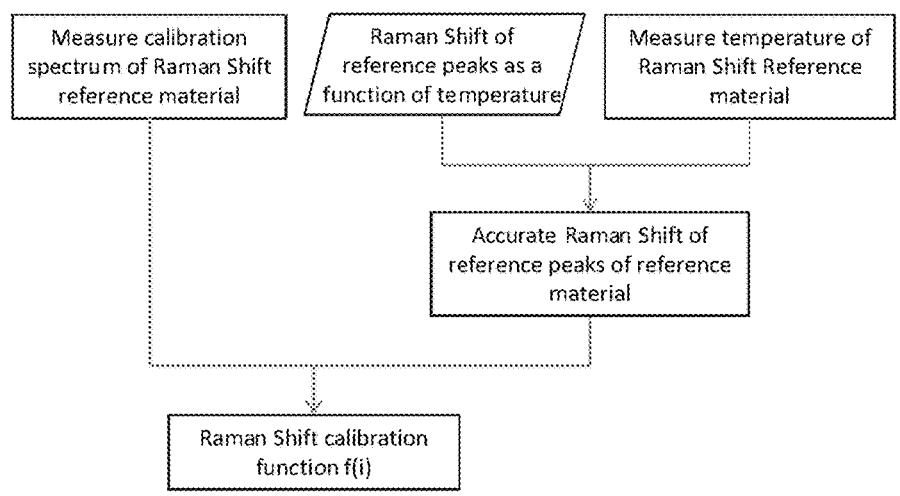

A second approach to derive the calibration function f(i) is to determine the accurate pixel positions of a number of Raman peaks of the reference material 110, and fit them against their accurate Raman shift values with a polynomial function. For a polynomial of order M that can adequately describe the true Raman shift curve R(i), at least M+1 Raman peaks are required. If a single reference material does not have enough reference peaks to use for fitting, additional reference materials may be used to obtain more reference peaks for calibration. FIG. 3b is a flowchart representing the second approach.

Figure 3C:
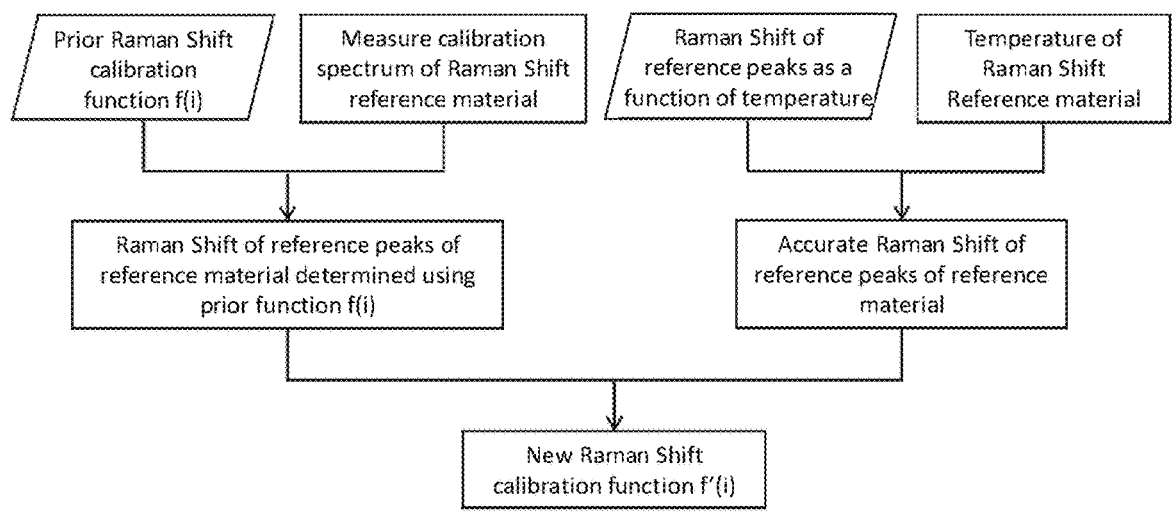

Once an accurate calibration function f(i) is obtained, subsequent calibrations can be done by repeating the process, or by using a variant of the method. One variant of the method comprises (a) measuring Z', the Raman shift values of one or more of the Raman peaks of the one or more reference materials determined using the existing calibration curve f(i), (b) fitting them against Z, which are the accurate Raman shift values determined at time of calibration, with a polynomial function g, Z=g(Z'), and (c) applying this polynomial to the prior calibration curve f(i) to obtain a new calibration curve f'(i), where f'(i)=g(f(i)). Often, the difference between the Z' and the Z values is small, on the level of a few wavenumbers or less, and the order of the polynomial g(x) can be as low as 0 or 1, meaning only 1 or 2 reference Raman peaks are needed to perform an accurate calibration. FIG. 3c is a flowchart representing this variant method.

FIGS. 4a, 4b, 4c, and 4d show the Raman shift of the four Raman peaks of polystyrene that are labeled 1, 2, 3, and 4 in FIG. 2a, respectively, measured at different temperatures ranging from −20 to 60° C. The Raman shifty as a function of temperature x for each of the four peaks are represented by the equation in the corresponding plot, as a result of a least square linear fit. Such measurements can be done using any Raman spectrometer with its Raman shift axis calibrated and maintained to a high degree of accuracy during the measurement process, preferably around 0.1 cm$^{-1}$. The form of the instrument used to make the measurement is not of material difference, so long as the result is accurate enough to describe the true relationships of the various reference peaks' Raman shift with temperature. For example, it can be a Fourier transform Raman spectrometer equipped with a gas laser as excitation source. Such spectrometer has the advantage that its excitation wavelength is stable and its wavenumber axis is calibrated by a separate laser as an integral part of its interferometer. The exemplary measurements shown in FIG. 4 are done using a dispersive Raman spectrometer equipped with a frequency stabilized 785 nm diode laser and a CCD detector. The entire spectrometer is placed in a stable environment of a constant temperature, and its Raman shift axis is calibrated using an argon lamp and a Raman shift reference material cyclohexane.

Figure 5:
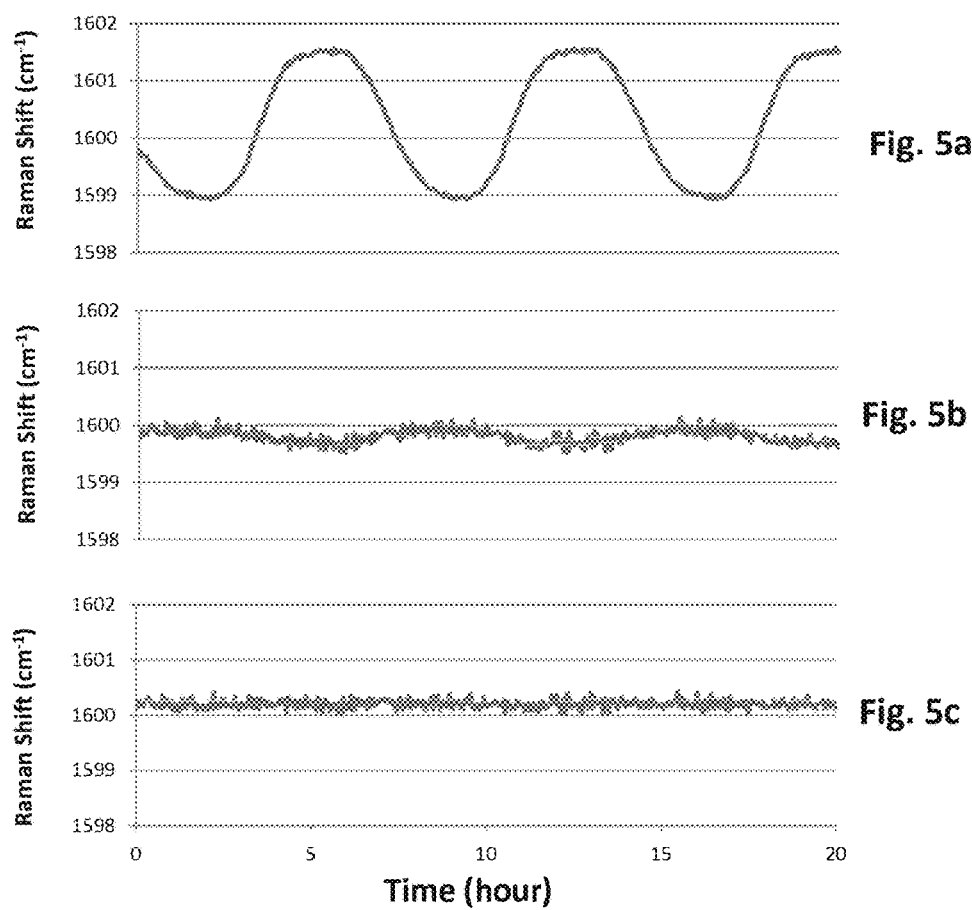
FIG. 5 illustrates the improved Raman shift stability using accurate peak positions of polystyrene as reference values for Raman shift calibration compared with using fixed peak position values as reference values, wherein the accurate peak positions of polystyrene are determined using the relationships determined in FIG. 4 and the temperature of the polystyrene reference material measured at the time when the calibration spectrum is measured.

FIG. 5 demonstrates the advantage of the calibration methods disclosed herein. The plot in FIG. 5a is the position of the 1600 cm$^{-1}$ peak of a 25% solution of benzonitrile in cyclohexane, measured over a period of 20 hours without re-calibrating the Raman shift while the spectrometer is subject to a periodic temperature variation between 13 and 32° C. The standard deviation in FIG. 5a is 1.0 cm$^{-1}$. The plot in FIG. 5b is the same measurement but with the Raman shift re-calibrated using a polystyrene reference before each sample measurement whereas the reference peak position values are provided in ASTM E1840-96. The standard deviation in FIG. 5b is reduced to 0.12 cm$^{-1}$. The plot in FIG. 5c is the same measurement but with the Raman shift re-calibrated using the same polystyrene reference before each sample measurement whereas the reference peak position values are determined using the temperature of the polystyrene reference measured at the time of the calibration and the Raman shift vs. temperature relationships shown in FIG. 4. The standard deviation in FIG. 5c is further reduced to 0.07 cm$^{-1}$.

Figure 6:
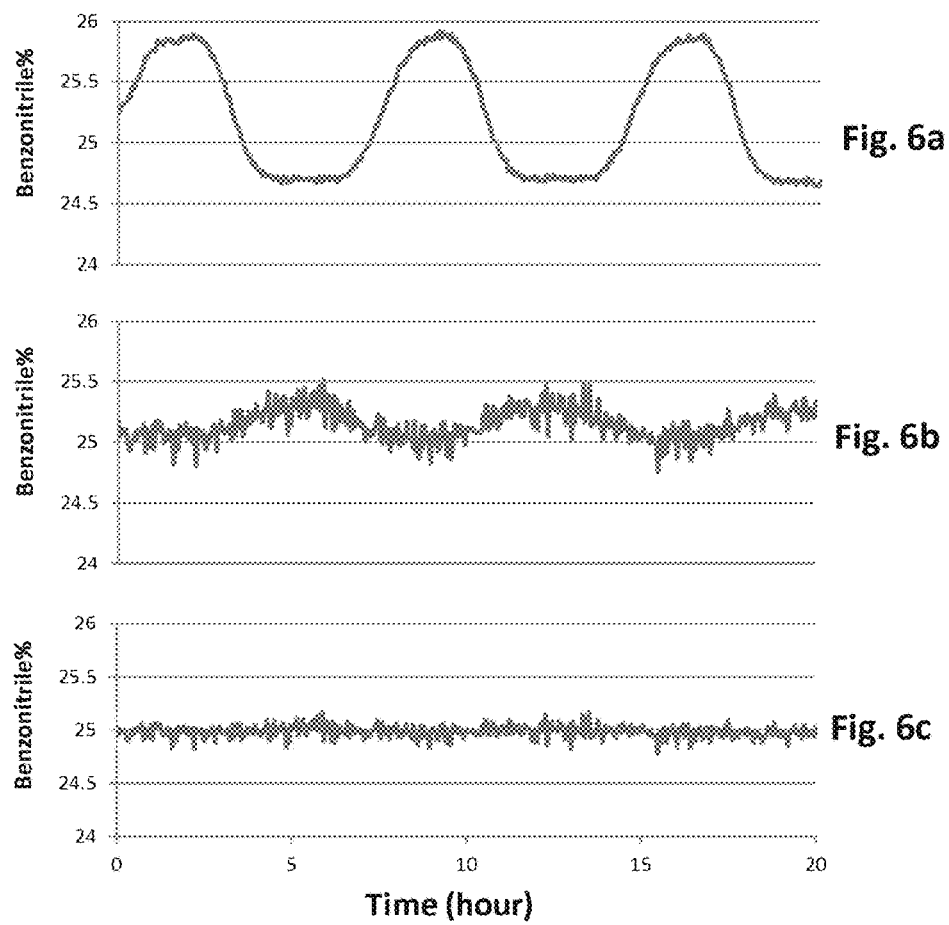
FIG. 6 illustrates the improved quantitative prediction precision using accurate peak position as reference values for Raman shift calibration compared with using fixed peak position as reference values.

FIG. 6 demonstrates the advantage of the calibration method disclosed herein when being used for quantitative chemical analysis. The plot in FIG. 6a is the concentration predicted of the 25% solution of benzonitrile in cyclohexane, over a period of 20 hours without re-calibrating the Raman shift while the spectrometer is subject to a period temperature variation between 13 and 32° C. The standard deviation in FIG. 6a is 0.47%. The plot in FIG. 6b is the same measurement but with the Raman shift re-calibrated using a polystyrene reference, before each sample measurement, whereas the reference peak position values are provided in ASTM E1840-96. The standard deviation in FIG. 6b is reduced to 0.13%. The plot in FIG. 6c is the same measurement, but with the Raman shift re-calibrated using the same polystyrene reference before each sample measurement, whereas the reference peak position values are determined using the temperature of the polystyrene reference measured at the time of calibration and the Raman shift vs. temperature relationships shown in FIG. 4. The standard deviation in FIG. 6c is further reduced to 0.056%. The predicted values are calculated using a partial least square regression model built with several samples having a benzonitrile concentration ranging from 10% to 35%. The method of model building and quantitative analysis are known to those with ordinary skills in the art of chemometrics and spectroscopy and are not repeated herein.

In the foregoing description, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A method for calibrating a Raman shift axis of a Raman spectrometer using one or more Raman shift reference materials, wherein the Raman spectrometer comprises an excitation source, a spectral analyzer, a sample interface, and a temperature sensor, wherein the one or more Raman shift reference materials have one or more Raman peaks, and relationships between Raman shift values of the one or more Raman peaks and a temperature are pre-established over a temperature range, the method comprising:
    measuring one or more calibration Raman spectra and a temperature of the one or more Raman shift reference materials;
    determining the Raman shift values of the one or more Raman peaks in the one or more calibration Raritan spectra based on the measured temperature and the pre-established relationships; and
    using the determined Raman shift values of the one or more Raman peaks and the measured one or more calibration Raman spectra to generate a Raman shift calibration function; and
    calibrating the Raman shift axis of the Raman spectrometer using the Raman shift calibration function.

2. The method of claim 1, further comprising measuring one or more spectra of one or more wavelength calibration light sources and generating a wavelength calibration function.

3. The method of claim 1, further comprising determining a Raman shift reference value of reference peaks of the one or more reference materials using a previously generated Raman shift calibration function, and generating a new Raman shift calibration function using the calibration Raman spectrum of the one or more Raman shift reference materials by modifying the previously generated Raman shift calibration function.

4. The method of claim 1, wherein the one or more Raman shift reference materials are selected from a group of materials that comprise one of the materials specified in ASTM E1840-96 (2014).

5. The method of claim 1, further comprising maintaining a constant temperature for the one or more Raman shift reference materials while measuring the one or more calibration Raman spectra.

6. The method of claim 1, further comprising monitoring the temperatures of the spectral analyzer and/or the excitation source and automatically initiating a new calibration of the Raman shift axis when the measured temperatures have deviated from the last calibration more than a predetermined threshold.

7. A device for measuring Raman scattering of a sample, comprising:
    an excitation source configured to generate an excitation light;
    a spectral analyzer;
    a sample interface, wherein during sample measurement the excitation light is delivered to the sample to generate Raman scattered light from the sample, and the Raman scattered light from the sample is delivered to the spectral analyzer;
    one or more Raman shift reference materials having one or more Raman peaks, wherein relationships between the Raman shift values of the one or more Raman peaks and temperatures are pre-established over a range of temperature;
    a calibration interface, wherein during a Raman shift calibration the excitation light is delivered to the one or more Raman shift reference materials to generate Raman scattered light for calibration and the Raman scattered light for calibration is delivered to the spectral analyzer through the calibration interface to measure one or more Raman shift calibration spectra;
    a sensor to measure a temperature of the one or more Raman shift reference materials or a temperature of the sample; and
    a storage storing a Raman shift calibration function for calibrating a Raman shift axis of the Raman spectrometer;
    wherein during the Raman shift calibration, the Raman shift values of the one or more Raman peaks of the one or more Raman shift reference materials are determined using the measured temperature of the one or more Raman shift reference materials and pre-established relationships between the Raman shift values and the temperature, and
    wherein the Raman shift values of the one or more Raman peaks of the one or more Raman shift reference materials and the one or more Raman shift calibration spectra are used to generate the Raman shift calibration function of the device.

8. The device of claim 7, further comprising means for switching a light path, whereby the excitation light from the excitation source and the Raman scattered light delivered to the spectral analyzer can be switched between the sample and the one or more Raman shift reference materials.

9. The device of claim 8, wherein the means for switching the light path comprises one or more fiber optic switches.

10. The device of claim 7, further comprising one or more wavelength calibration light sources.

11. The device of claim 7, further comprising one or more temperature sensors that monitor a temperatures of the spectral analyzer and the excitation source in order to automatically initiate a new calibration of a Raman shift axis when the measured temperatures have deviated significantly from the temperatures measured during a last Raman shift calibration.

12. The device of claim 7, further comprising a regulator to control the temperature of the one or more Raman shift reference material.

13. A device for measuring Raman scattering of a sample comprising:
    a Raman spectrometer comprising an excitation source, a spectral analyzer, wherein the excitation source is configured to generate an excitation light;
    one or more Raman shift reference materials having one or more Raman peaks, wherein relationships between Raman shift values of the one or more Raman peaks and a temperature of the one or more Raman shift reference materials are pre-established over a range of temperatures; and
    a sensor to measure a temperature of the one or more Raman shift reference materials or a temperature of the sample; and
    a storage storing a Raman shift calibration function for calibrating a Raman shift axis of the Raman spectrometer; and
    one or more processing circuits configured to determine Raman shift values of the one or more Raman peaks of the one or more Raman shift reference materials using the measured temperature and the pre-established relationships to calibrate a Raman shift axis of the spectrometer and to generate the Raman shift calibration function.

* * * * *